US012220844B2

(12) United States Patent
Ou et al.

(10) Patent No.: US 12,220,844 B2
(45) Date of Patent: Feb. 11, 2025

(54) BOTTLE LABEL REMOVING AND CLEANING INTEGRATED SYSTEM

(71) Applicant: ZHEJIANG BORETECH ENVIRONMENTAL ENGINEERING CO., LTD., Zhejiang (CN)

(72) Inventors: Zhewen Ou, Zhejiang (CN); Keying Chen, Zhejiang (CN)

(73) Assignee: Zhejiang Boretech Environmental Engineering Co., Ltd., Zhejiang (CN)

( * ) Notice: Subject to any disclaimer, the term of this patent is extended or adjusted under 35 U.S.C. 154(b) by 0 days.

(21) Appl. No.: 18/272,526

(22) PCT Filed: Nov. 15, 2022

(86) PCT No.: PCT/CN2022/131973
§ 371 (c)(1),
(2) Date: Jul. 14, 2023

(87) PCT Pub. No.: WO2023/041094
PCT Pub. Date: Mar. 23, 2023

(65) Prior Publication Data
US 2024/0083072 A1    Mar. 14, 2024

(30) Foreign Application Priority Data

Sep. 17, 2021    (CN) .......................... 202111095177.0

(51) Int. Cl.
*B29B 17/02*    (2006.01)
*B07B 1/46*    (2006.01)
*B08B 3/14*    (2006.01)

(52) U.S. Cl.
CPC ............ *B29B 17/02* (2013.01); *B07B 1/4609* (2013.01); *B08B 3/14* (2013.01); *B29B 2017/0224* (2013.01)

(58) Field of Classification Search
CPC ........... B07B 1/15; B08B 9/083; B29B 17/02; B29B 2017/022; B29B 2017/0217
(Continued)

(56) References Cited

U.S. PATENT DOCUMENTS 5,123,993 A     6/1992  Wiggins
5,462,238 A *  10/1995  Smith ................. B02C 18/2283
                                                    241/292.1
(Continued)

FOREIGN PATENT DOCUMENTS

CN          104984947 A      10/2015
CN          206123997 U       4/2017
(Continued)

OTHER PUBLICATIONS

PCT International Search Report mailed Feb. 20, 2023 in counterpart PCT application PCT/CN2022/131073, 3 pages in English.

*Primary Examiner* — Michael McCullough
*Assistant Examiner* — Molly K Devine
(74) *Attorney, Agent, or Firm* — Juan Carlos A. Marquez; Marquez IP Law Office, PLLC

(57) ABSTRACT

The present invention relates to a bottle label removing and cleaning integrated system, including a support platform, and further including a label removing and cleaning machine, a bouncing separation screen, a cleaning liquid separator, and a cleaning liquid buffer tank that are sequentially connected, where the label removing and cleaning machine is mounted on the support platform, the bouncing separation screen is configured to separate cleaning water, labels, and impurities from main materials, and the cleaning liquid buffer tank is configured to accommodate cleaning liquid purified by the cleaning liquid separator.

19 Claims, 6 Drawing Sheets

(58) Field of Classification Search
USPC .......................................... 209/1, 667, 671
See application file for complete search history.

(56) References Cited

U.S. PATENT DOCUMENTS

| | | | |
|---|---|---|---|
| 6,250,478 B1 * | 6/2001 | Davis | B07B 1/15 |
| | | | 209/660 |
| 9,089,878 B2 * | 7/2015 | Herbold | B08B 9/083 |
| | | | 134/6 |
| 9,796,004 B2 * | 10/2017 | Previero | B08B 9/38 |
| 2003/0070754 A1 * | 4/2003 | Francis | B07B 1/14 |
| | | | 156/709 |
| 2017/0304868 A1 * | 10/2017 | Parr | D21D 5/046 |

FOREIGN PATENT DOCUMENTS

| | | |
|---|---|---|
| CN | 107175783 A | 9/2017 |
| CN | 207823392 U | 9/2018 |
| CN | 112026059 A | 12/2020 |
| CN | 113858485 A | 12/2021 |
| CN | 216230247 U | 4/2022 |

\* cited by examiner

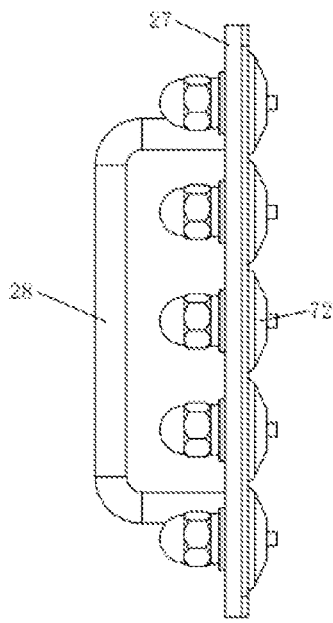
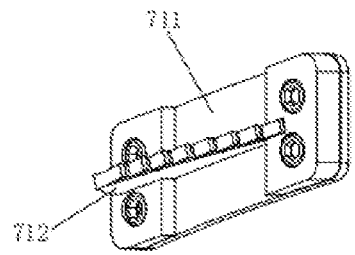
FIG. 5
FIG. 7
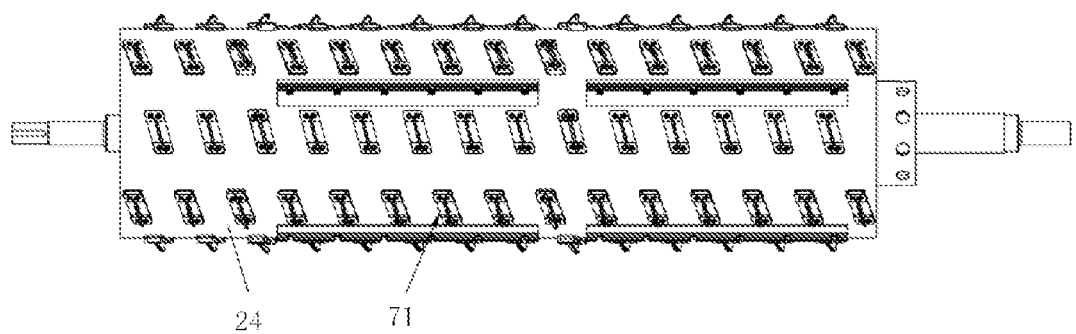
FIG. 4
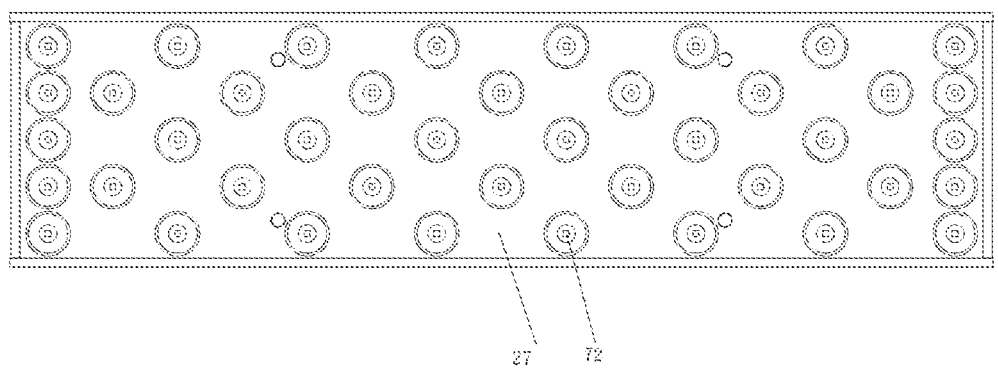
FIG. 6

BOTTLE LABEL REMOVING AND CLEANING INTEGRATED SYSTEM

CROSS-REFERENCE TO RELATED APPLICATION

This application is a national stage application filed under 35 U.S.C. 371 of International Application No. PCT/CN2022/131973 filed Nov. 15, 2022, which claims priority to China Patent Application 202111095177.0 filed Sep. 17, 2021. The disclosures of the above applications are incorporated herein by reference in their entireties.

FIELD OF THE INVENTION

The present invention relates to the field of plastic recycling and cleaning technical field, in particular, to a bottle label removing and cleaning integrated system.

BACKGROUND

Plastic recycling refers to the use of certain recycling processes to recycle and reuse waste plastics to achieve the purpose of turning trash into treasure. Currently, China's waste plastics are mainly plastic films, plastic yarns and woven products, foam plastics, plastic packaging boxes and containers, daily-use plastic products, plastic bags, and agricultural mulch films.

The regeneration system of plastic recycling usually adopts physical methods, and includes equipment for processes of sorting, material pretreatment, cleaning, drying, granulation, and the like. The process of cleaning for the waste plastics is very important. The waste plastics need to be fully cleaned, so that the residual impurities of organic matter in the cleaned materials are minimized, the quality is infinitely close to the raw materials, and the fields for renewable use are wider, to ensure the quality and safety of subsequent plastic products.

In the existing technologies, for example, the Chinese patent whose publication number is CN209191070U discloses a discharged label collection device for label removing machine, including a label blowing channel in communication with the label removing machine, a vent pipe for weakening the label blowing airflow discharged from the label blowing channel, an unloader in communication with the vent pipe to collect free-falling labels, and a conveying device in communication with the outlet of the unloader to export the collected labels.

The existing technical solutions have the following disadvantages: Generally same as the current process design in the industry, the existing technical solutions basically adopt a process design of label removing, label blowing, and whole bottle cleaning that are mutually independent. The whole system is complex in process as label removing needs to be performed first on the plastic bottles before cleaning. As a result, time and labor are wasted, the cleaning efficiency is reduced, and the equipment investment and operating costs are high.

SUMMARY OF THE INVENTION

For the insufficiencies in the existing technologies, an objective of the present invention is to provide a bottle label removing and cleaning integrated system which integrates the functions implemented by the combination of numerous conventional independent functional devices through the development design of multifunctional devices and system optimization, thereby reducing the use of equipment, reducing time and labor, improving the cleaning efficiency, greatly reducing equipment investment and operating costs, and achieving improvement in cleaning performance.

The invention objective of the present invention is implemented by the following technical solution:

A bottle label removing and cleaning integrated system is provided, including a support platform, and further including a label removing and cleaning machine, a bouncing separation screen, a cleaning liquid separator, and a cleaning liquid buffer tank that are sequentially connected, where the label removing and cleaning machine is mounted on the support platform, the bouncing separation screen is configured to separate cleaning water, labels, and impurities from main materials, and the cleaning liquid buffer tank is configured to accommodate cleaning liquid purified by the cleaning liquid separator.

In a preferred example, the present invention can be further configured as that: the label removing and cleaning machine includes a machine base, a driving device, a drum, and a rotor, where the machine base has one side provided with a feed port and another side provided with a discharge port, and the bouncing separation screen is arranged at the bottom of the discharge port; and the rotor is in a transmission connection to the driving device, the rotor is arranged inside the drum and is arranged coaxially with the drum, a cleaning chamber connected to the feed port and the discharge port is formed between the rotor and the drum, and the cleaning chamber is internally provided with a scraping mechanism configured to squeeze and scrape materials.

In a preferred example, the present invention can be further configured as that: the scraping mechanism includes a plurality of moving blades and a plurality of fixed blades, where the plurality of moving blades are detachably fixed on an outer sidewall of the rotor, and the plurality of fixed blades are detachably fixed on an inner wall of the drum.

In a preferred example, the present invention can be further configured as that: the drum is detachably fixedly connected to a plurality of marking discs, the plurality of fixed blades are detachably fixed on the marking discs, and one side of each of the marking discs away from the cleaning chamber is fixedly connected to a plurality of handles.

In a preferred example, the present invention can be further configured as that: the label removing and cleaning machine is provided with a plurality of water injection ports in communication with the cleaning chamber.

In a preferred example, the present invention can be further configured as that: the bouncing separation screen includes an inclined frame, a screening mechanism and a receiving tray, where the screening mechanism is mounted on an upper layer of the inclined frame to screen materials, and the receiving tray is mounted on a lower layer of the inclined frame to discharge labels, bottle caps, and impurities.

In a preferred example, the present invention can be further configured as that: the screening mechanism includes a geared motor and a plurality of bouncing shafts, where the geared motor is mounted on one side of the inclined frame to drive the plurality of bouncing shafts to rotate on the inclined frame, and a plurality of bouncing screening sheets are evenly arranged on axial outer sides of the bouncing shafts.

In a preferred example, the present invention can be further configured as that: bouncing screening sheets of two adjacent bouncing shafts are arranged in a staggered manner, and a gap is provided between two adjacent bouncing screening sheets on a same bouncing shaft.

In a preferred example, the present invention can be further configured as that: the bouncing screening sheet is in a shape of a Reuleaux triangle.

In a preferred example, the present invention can be further configured as that: the bottom of the inclined frame is provided with a main material discharge port and a residue discharge port, and the residue discharge port is in communication with the cleaning liquid separator.

Given all that, the present invention includes at least one of the following beneficial technical effects:

1. By brand-new design for the label removing machine, this system enables the label removing and cleaning machine to implement strong cleaning while label removing; the bouncing separation screen is newly designed to separate the cleaning water, labels, and impurities from the main materials; and the cleaning water passes through the filtration system in the cleaning liquid separator, so that the cleaning water is completely separated from the labels and impurities, and large amount of the cleaning water can be recycled and reused. The system design integrates the functions implemented by the combination of numerous conventional independent functional devices through the development design of multifunctional devices and system optimization, thereby reducing the use of equipment, greatly reducing equipment investment and operating costs, and achieving improvement in cleaning performance.

2. The materials enter the cleaning chamber in the drum from the feed port, the driving device drives the rotor to rotate. Through the angled moving blades on the rotor, waste plastic bottles are repeatedly rubbed between the plurality of fixed blades on the inner wall of the drum and the plurality of moving blades on the outer sidewall of the rotor, so that the labels can be peeled off from the bottle bodies by fully rubbing. The moving blades are arranged on the outer sidewall of the rotor in a spiral order, and can further push and transport the waste plastic bottles to the discharge port. In the process of the bottle materials being pushed by the moving blades, the labels are peeled off through squeezing and scraping formed between the bottle materials and the fixed blades, until the bottle materials are discharged from the discharge port.

3. The geared motor drives the plurality of bouncing shafts to rotate through a chain, and the bouncing shafts drive the plurality of bouncing screening sheets to rotate. When the materials (bottles after cleaning, including bottles, labels, water, bottle caps, and other impurities) are in contact with the bouncing screening sheets, because the bottle has large weight and volume and small contact area, the bottle can be bounced by the bouncing screening sheets and bounce upwards along the screening sheets on the roller on the screening surface, and because the weight of the bottle is relatively large, the surface is smooth, and the contact area between the bottle body and the screening sheet is small, the bottle cannot be driven to the left for separation by the screening sheet, and can only slide down while jumping along the screening sheet to the right. The label cannot be bounced due to its lightness and softness, the weight is small, and the contact area is large, so the label is driven along the screening sheet to the left. Other impurities, water, bottle caps, and other small-sized materials fall from the gap between two adjacent bouncing screening sheets, are collected in the water receiving tray of the lower layer, pass through a pipe, and flow, with the water flow, to a filtration equipment in the cleaning liquid separator. The setting of a cover plate effectively prevents the bottles from bouncing out of the bouncing separation screen, thereby improving practicability.

BRIEF DESCRIPTION OF THE DRAWINGS

FIG. 4 is a schematic structural diagram of a rotor according to the present invention;

FIG. 5 is a schematic structural diagram of a moving blade according to the present invention;

FIG. 6 is a schematic plan view of a marking disc according to the present invention;

FIG. 7 is a side view of a marking disc according to the present invention;

DETAILED DESCRIPTION

Figure 1:
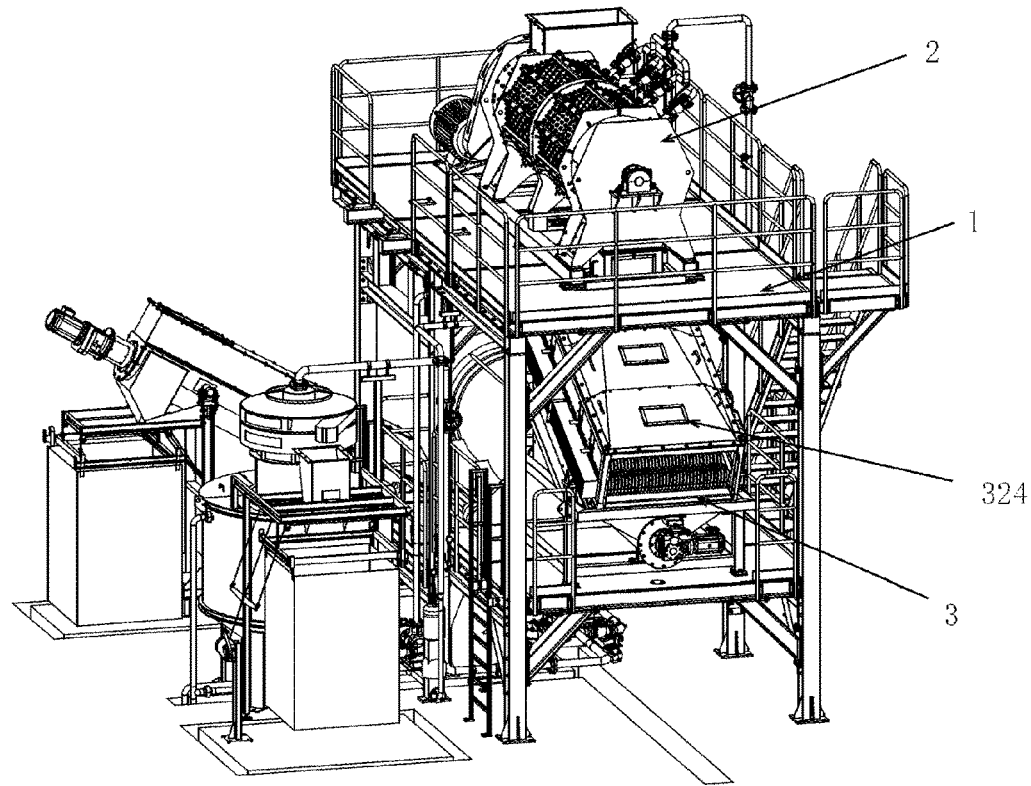
FIG. 1 is a schematic diagram of an integral structure of the present invention.
Figure 1:
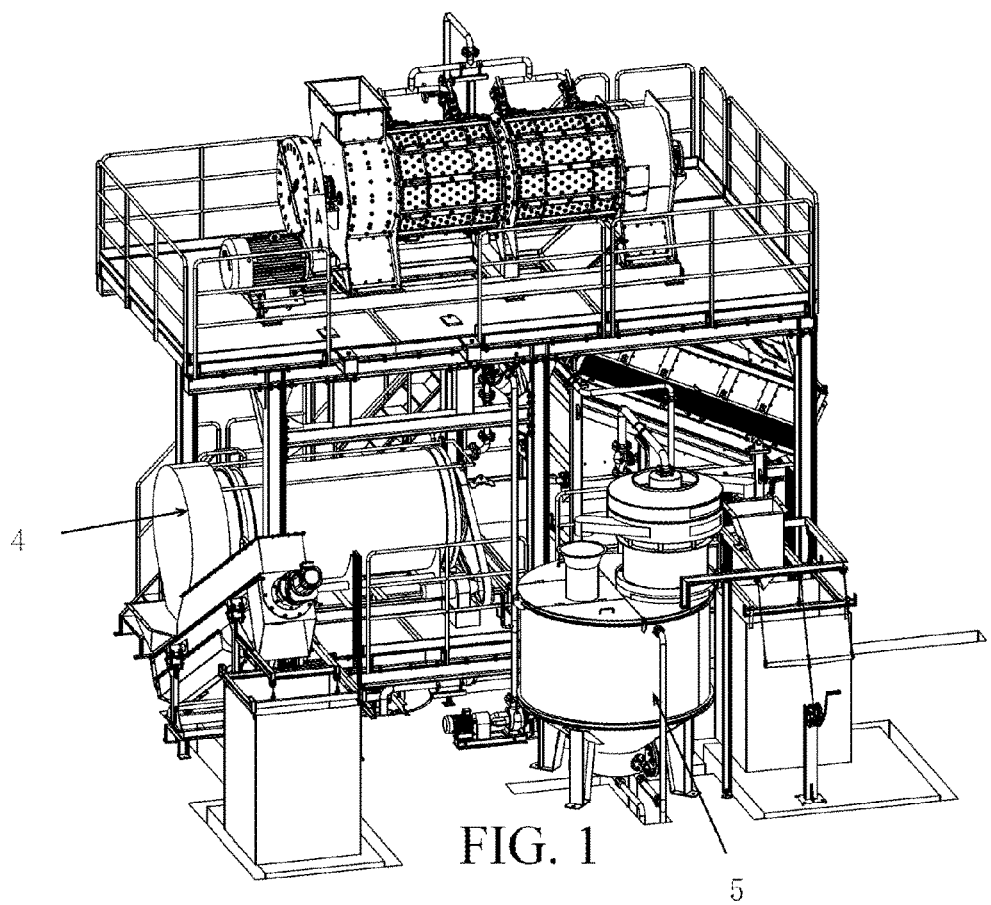
Figure 2:
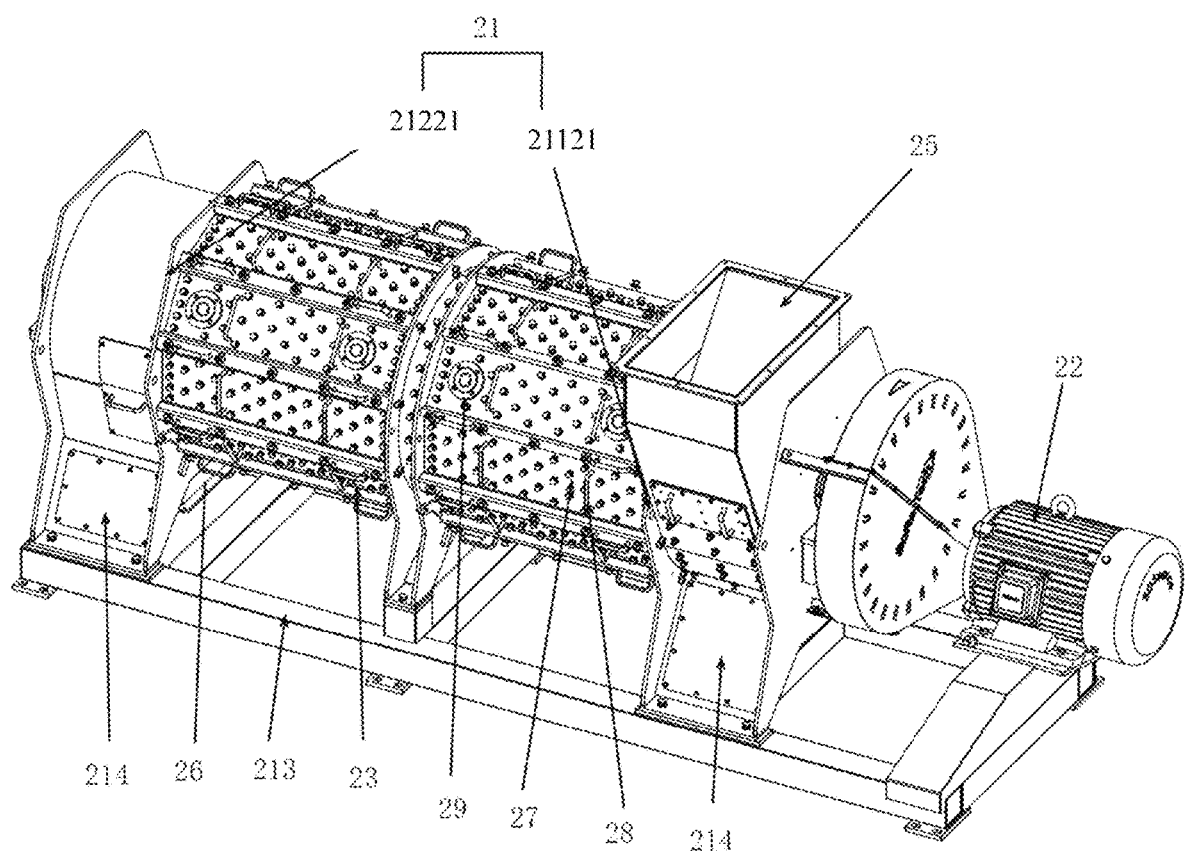
FIG. 2 is a schematic structural diagram of a label removing and cleaning machine according to the present invention.
Figure 3:
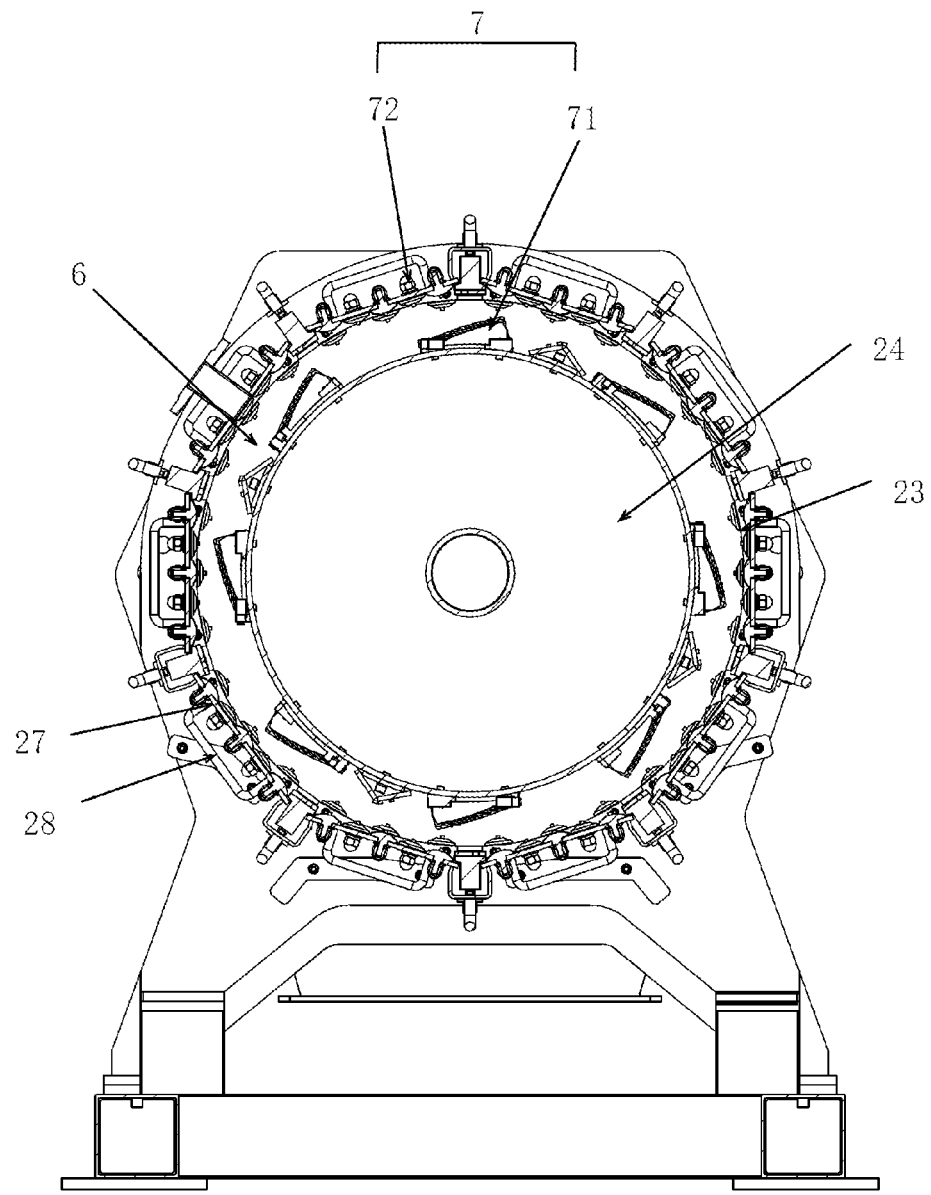
FIG. 3 is a cross-sectional view of a label removing and cleaning machine according to the present invention.
Figure 8:
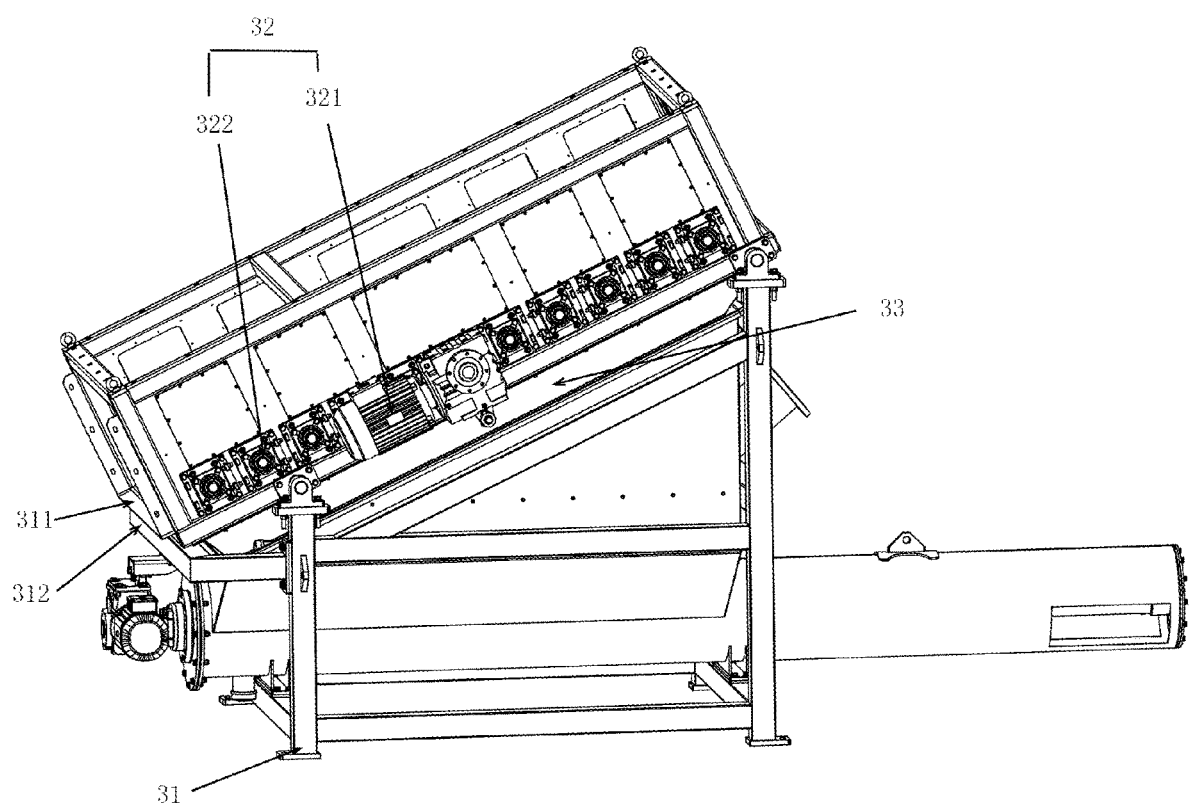
FIG. 8 is a schematic structural diagram of a bouncing separation screen according to the present invention.
Figure 9:
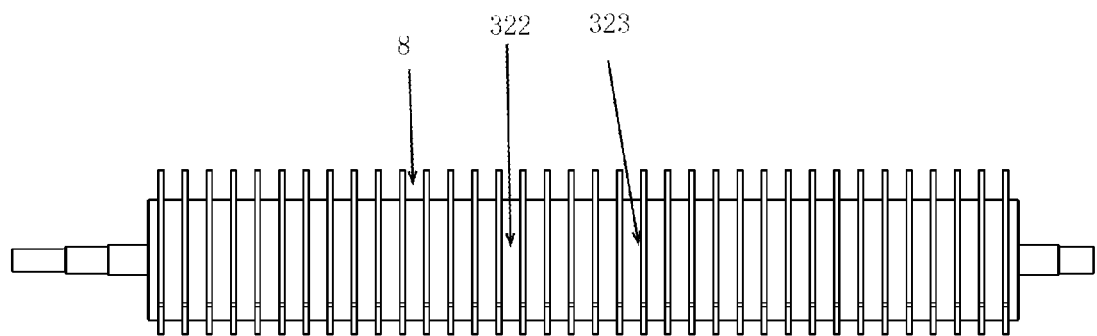
FIG. 9 is a schematic structural diagram of a bouncing shaft according to the present invention.
Figure 10:
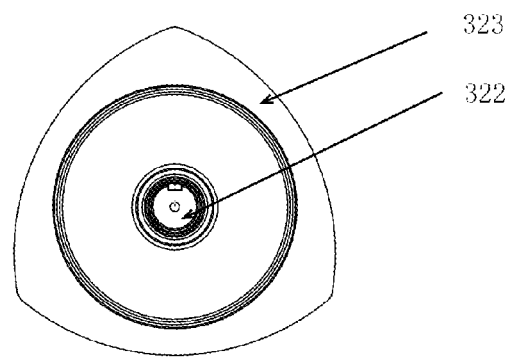
FIG. 10 is a schematic plan view of a bouncing screening sheet according to the present invention.

A plurality of implementations or examples are provided below to implement different features of this disclosure. A specific example of an assembly and a configuration described below is used to simplify the disclosure. It is contemplated that such descriptions are merely examples, and are not intended to limit the disclosure. For example, in the following description, a first feature is formed on or above a second feature, and the description may include that, in some embodiments, the first feature and the second feature directly contact with each other; and the description may further include that, in some embodiments, an additional assembly is formed between the first feature and the second feature, so that the first feature and the second feature may not be in direct contact. In addition, the disclosure may repeat assembly symbols and/or labels in various embodiments. The repetition is for the purpose of brevity and clarity, but does not indicate a relationship between the various embodiments and/or configurations discussed.

Further, space-related terms such as "under", "below", lower", "above", and "over" are used herein for the ease of the description of a relationship between an assembly or a feature relative to another or a plurality of assemblies or features shown in the figure. The space-related terms are intended to encompass different orientations of the device in use or operation in addition to the orientations depicted in the figures. The device may be disposed at other orientations (for example, rotating by 90 degrees or being located at other orientations), and the space-related terms should interpret accordingly.

Value range and parameters that are used to define a relatively wide scope of this application are all approximate values, but related values in specific embodiment are presented herein as accurately as possible. However, any numerical value inevitably includes a standard deviation caused by an individual test method. As described herein, the term "about" generally means that an actual value falls within plus or minus 10%, 5%, 1%, or 0.5% of a specific value or range. Alternatively, the term "about" means that the actual value falls within an acceptable standard error of an average value, depending on the consideration of a person of ordinary skill in the art of this application. It should be understood that, in addition to experimental examples, or unless otherwise clearly stated, all ranges, quantities, values, and percentages (for example, being used for describing material use amount, time length, temperature, operation condition, quantity ratio, and the like) used herein are all modified by "about". Therefore, unless otherwise stated to the contrary, the values and parameters disclosed in this specification and the attached claims are all approximate values, and may be changed as required. At least these numerical parameters should be considered as indicated valid bits and the value obtained by applying the general rounding method. As described herein, the value range is expressed to move from one end to another end or locate between the two ends; unless otherwise stated, the value range described herein include endpoints.

The following further describes the present invention in detail with reference to the accompanying drawings.

Referring to FIG. 1, the present invention discloses a bottle label removing and cleaning integrated system, including a support platform 1, and further including a label removing and cleaning machine 2, a bouncing separation screen 3, a cleaning liquid separator 4, and a cleaning liquid buffer tank 5 that are sequentially connected, where the label removing and cleaning machine 2 is mounted on the support platform 1, the bouncing separation screen 3 is configured to separate cleaning water, labels, and impurities from main materials, and the cleaning liquid buffer tank 5 is configured to accommodate cleaning liquid purified by the cleaning liquid separator 4.

The label removing and cleaning machine 2 includes a machine base 21, a driving device 22, a drum 23, and a rotor 24, where the machine base 21 has one side provided with a feed port 25 and another side provided with a discharge port 26, and the bouncing separation screen 3 is arranged at the bottom of the discharge port 26. The rotor 24 is in a transmission connection to the driving device 22, the rotor 24 is arranged inside the drum 23 and is arranged coaxially with the drum 23, a cleaning chamber 6 connected to the feed port 25 and the discharge port 26 is formed between the rotor 24 and the drum 23, and the cleaning chamber 6 is internally provided with a scraping mechanism 7 configured to squeeze and scrape materials.

In the process of cleaning, bottle materials enter the cleaning chamber 6 from the feed port 25, the driving device 22 moves and drives the rotor 24 to rotate inside the drum 23, and the materials are scraped under the action of the scraping mechanism 7 in the cleaning chamber 6, so that the labels are separated from the bottle bodies. The materials are mixed with the cleaning liquid and enter the cleaning chamber 6 when entering the label removing and cleaning machine 2, and strong cleaning for the materials is completed while label removing. The materials after label removing and cleaning are mixed with the cleaning liquid and enter the bouncing separation screen 3 from the discharge port 26, and the bouncing separation screen 3 separates the cleaning liquid, labels, and impurities from the main materials. The main materials after label removing and cleaning enter a subsequent process for further processing, and the cleaning liquid enters the cleaning liquid separator 4 where the labels, impurities, and cleaning liquid are completely separated and purified, and is recycled and reused after being buffered in the cleaning liquid buffer tank 5.

The machine base 21 includes a left machine base 21121 and a right machine base 21221 that are fixed on a bottom base 213, the drum 23 and the rotor 24 are mounted between the left machine base 21121 and the right machine base 21221. In this embodiment, the driving device 22 is configured as a motor and is detachably fixed on the bottom base 213 on one side of the left machine base 21121, and the motor drives the rotor 24 to rotate in the drum 23 through a belt. Both the left machine base 21121 and the right machine base 21221 are provided with an inspection port 214, the feed port 25 is arranged on the left machine base 21121 with the opening upward, the discharge port 26 is arranged at the bottom of the right machine base 21221 with the opening downward, and a belt cover is mounted outside the belt, effectively improving the safety of the entire equipment.

The scraping mechanism 7 includes a plurality of moving blades 71 and a plurality of fixed blades 72, where the plurality of moving blades 71 are detachably fixed on an outer sidewall of the rotor 24, and the plurality of fixed blades 72 are detachably fixed on an inner wall of the drum 23. The materials enter the cleaning chamber 6 in the drum 23 from the feed port 25, the driving device 22 drives the rotor 24 to rotate. Through the angled moving blades 71 on the rotor 24, waste plastic bottles are repeatedly rubbed between the plurality of fixed blades 72 on the inner wall of the drum 23 and the plurality of moving blades 71 on the outer sidewall of the rotor 24, so that the labels can be peeled off from the bottle bodies by fully rubbing. The moving blades 71 are arranged on the outer sidewall of the rotor 24 in a spiral order, and can further push and transport the waste plastic bottles to the discharge port 26. In the process of pushing and transporting the bottle materials, the labels are peeled off through contact between the moving blades 71 and the fixed blades 72, until the bottle materials are discharged from the discharge port 26.

The moving blade 71 includes a mounting plate 711 and a rubbing plate 712 vertically fixed on the mounting plate 711. In this embodiment, the mounting plate 711 is detachably fixed on the outer sidewall of the rotor 24 by a plurality of bolts, and the plane of the rubbing plate 712 away from the mounting plate 711 is in an inclined step-shape, so that the scraping force of the moving blade 71 can be greatly enhanced, to effectively scrape off the labels from the waste plastic bottles. Viewed from the cross section of the rotor 24, the rubbing plates 712 on the outer sidewall of the rotor 24 are arranged in the same counterclockwise or clockwise spiral direction, so that the labels on the waste plastic bottles can be better scraped off during rotation, and usability is improved.

The drum 23 is detachably fixedly connected to a plurality of marking discs 27, the plurality of fixed blades 72 are detachably fixed on the marking discs 27, and one side of each of the marking discs 27 away from the cleaning chamber 6 is fixedly connected to a plurality of handles 28. The plurality of fixed blades 72 are detachably fixed on the marking discs 27 by bolts, and the marking discs 27 are detachably fixed on the drum 23 by bolts. When a fixed blade 72 of a certain part is damaged due to wear, the marking disc 27 of this part can be detached, and then the damaged fixed blade 72 is replaced, which is convenient for disassembly and maintenance.

The handles 28 are arranged to conveniently detach the marking discs 27 from the drum 23, thereby improving the practicability. Each fixed blade 72 is a shape of a convex arc surface in a circular shape, and the middle position of the convex arc surface is fixedly connected with a rectangular cutter bit, thereby improving the friction between the waste plastic bottles and the cutter bit and the squeezing force between the materials, so that the labels can be more effectively peeled off from the waste plastic bottles.

The label removing and cleaning machine 2 is provided with a plurality of water injection ports 29 in communication with the cleaning chamber 6, and the plurality of water injection ports 29 are arranged to conveniently add the cleaning liquid into the cleaning chamber 6, to complete the strong cleaning for the materials while label removing, and further enhance the label removal effect of the cleaning liquid. Adding cleaning liquid into the cleaning chamber 6 can reduce the difficulty of scraping the labels, and in addition, high-speed rotation of the rotor 24 in the drum 23 improves the capacity of water cleaning, so that the impurities such as the bottles and labels can be effectively cleaned, and the cleanliness of the materials is improved.

The bouncing separation screen 3 includes an inclined frame 31, a screening mechanism 32 and a receiving tray 33, where the screening mechanism 32 is mounted on an upper layer of the inclined frame 31 to screen materials, and the receiving tray 33 is mounted on the lower layer of the inclined frame 31 to discharge labels, bottle caps, and impurities. The materials after label removing and cleaning fall on the screening mechanism 32 through the discharge port 26, and the screening mechanism 32 can separate the cleaning water, labels, and impurities from the main materials. The main materials after label removing and cleaning enter a subsequent process for further processing, and the cleaning water, labels, and impurities are screened out by the screening mechanism 32 and fall into the receiving tray 33.

The screening mechanism 32 includes a geared motor 321 and a plurality of bouncing shafts 322, where the geared motor 321 is mounted on one side of the inclined frame 31 to drive the plurality of bouncing shafts 322 to rotate on the inclined frame 31, and a plurality of bouncing screening sheets 323 are evenly arranged on axial outer sides of the bouncing shafts 322. A cover plate 324 detachably fixedly connected to the inclined frame 31 is arranged above the plurality of bouncing screening sheets 323. Bouncing screening sheets 323 of two adjacent bouncing shafts 322 are arranged in a staggered manner, and a gap 8 is provided between two adjacent bouncing screening sheets 323 on a same bouncing shaft 322.

The bouncing screening sheet 323 is designed with an upper layer and a lower layer. The upper layer is formed by the combination of vibrating and bouncing rotors 24, and driven by a gear motor, a main body of the lower layer is a steel structure and a water receiving tray, and the upper layer and the lower layer are connected by pin shafts.

The geared motor 321 drives the plurality of bouncing shafts 322 to rotate through a chain, and the bouncing shafts 322 drive the plurality of bouncing screening sheets 323 to rotate. When the materials (bottles after cleaning, including bottles, labels, water, bottle caps, and other impurities) are in contact with the bouncing screening sheets 323, because the bottle has large weight and volume and small contact area, the bottle can be bounced by the bouncing screening sheets 323 and bounce upwards along the screening sheets on the roller on the screening surface, and because the relative weight of the bottle is large, the surface is smooth, and the contact area between the bottle body and the screening sheet is small, the bottle cannot be driven to the left for separation by the screening sheet, and can only slide down while jumping along the screening sheet to the right.

The label cannot be bounced due to its lightness and softness, the weight is small, and the contact area is large, so the label is driven along the screening sheet to the left. Other impurities, water, bottle caps, and other small-sized materials fall from the gap 8 between two adjacent bouncing screening sheets 323, are collected in the water receiving tray of the lower layer, pass through a pipe, and flow, with the water flow, to a filtration equipment in the cleaning liquid separator 4. The setting of the cover plate 324 effectively prevents the bottles from bouncing out the bouncing separation screen 3, thereby improving the practicability.

The bottom of the inclined frame 31 is provided with a main material discharge port 311 and a residue discharge port 312, and the residue discharge port 312 is in communication with the cleaning liquid separator 4. Small-sized materials such as labels, water, and bottle caps are discharged from the residue discharge port 312, pass through a pipe, and flow, with the water flow, to the filtration equipment in the cleaning liquid separator 4. The main materials between the cover plate 324 and the bouncing separation screen 3 are discharged from the main material discharge port 311 under the gravity action, and the main materials after label removing and cleaning enter a subsequent process for further processing.

In this embodiment, the bouncing screening sheet 323 is in a shape of a Reuleaux triangle. The Reuleaux triangle, also called "Reuleaux triangle", "Reuleaux triangle", and "arc triangle", is a special triangle. The vertexes of a regular triangle are as the centers and the side length is as the radius to draw arcs, and the curved triangle formed by these three arcs is called the Reuleaux triangle. The characteristic of the Reuleaux triangle is: constant width in any direction, that is, it can freely rotate between two parallel lines whose distance is equal to the arc radius a (equal to the side length of the regular triangle), and always keep in contact with the two straight lines. The mechanical processing industry uses this characteristic to make the cross section of a drill bit into the shape of the Reuleaux triangle, to drill a square hole on a part. This characteristic was discovered by Reuleaux when studying mechanical classification.

The implementation principle of this embodiment is: by brand-new design for the label removing machine, this system enables the label removing and cleaning machine 2 to implement strong cleaning while label removing; the bouncing separation screen 3 is newly designed to separate the cleaning water, labels, and impurities from the main materials; and the cleaning water passes through the filtration system in the cleaning liquid separator 4, so that the cleaning water is completely separated from the labels and impurities, and large amount of the cleaning water can be recycled and reused. The system design integrates the functions implemented by the combination of numerous conventional independent functional devices through the development design of multifunctional devices and system optimization, thereby reducing the use of equipment, greatly reducing equipment investment and operating costs, and achieving improvement in cleaning performance.

The features of the several embodiments summarized above make those skilled in the art can better understand aspects of this application. Those skilled in the art should appreciate that they can easily use this application as a basis for designing or modifying other processes and structures for implementing the same objectives and/or implementing the same advantages of the embodiments described in this specification. Those skilled in the art should also be aware that such equivalent constructions do not depart from the spirit and scope of the present disclosure, and that they can make variations, replacements and modification in this specification without departing from the spirit and scope of the present disclosure.

In addition, the scope of this application is not limited to processes, machines, manufacturing, material composition, components, methods, and steps in a specific embodiment in this specification. Those of ordinary skill in the art can easily understand and use, according to the above disclosures, processes, machines, manufacturing, material composition, components, methods, and steps that currently exist or will be developed later and that perform substantially the same functions as the corresponding embodiments described herein or obtain substantially the same results as the embodiments described herein. Therefore, the attached claims intend to include such processes, machines, manufacturing, material compositions, components, methods, or steps within the scope thereof.

We claim:

1. A bottle label removing and cleaning integrated system, comprising a support platform, and further comprising a label removing and cleaning machine, a bouncing separation screen, a cleaning liquid separator, and a cleaning liquid buffer tank that are sequentially connected, wherein the label removing and cleaning machine is mounted on the support platform, the bouncing separation screen is configured to separate cleaning water, labels, and impurities from main materials, and the cleaning liquid buffer tank is configured to accommodate cleaning liquid purified by the cleaning liquid separator; wherein the label removing and cleaning machine comprises a machine base, a driving device, a drum, and a rotor, a cleaning chamber formed between the rotor and the drum, the cleaning chamber is internally provided with a scraping mechanism configured to squeeze and scrape materials, the scraping mechanism comprises a plurality of moving blades and a plurality of fixed blades, the drum is detachably fixedly connected to a plurality of marking discs, the plurality of fixed blades are detachably fixed on the marking discs, and one side of each of the marking discs away from the cleaning chamber is fixedly connected to a plurality of handles, each handle is placed on the corresponding marking disc with a direction parallel to a short edge of the corresponding marking disc, in order to facilitate the removal of the corresponding marking disc from the drum.

2. The bottle label removing and cleaning integrated system of claim 1, wherein the machine base has one side provided with a feed port and another side provided with a discharge port, and the bouncing separation screen is arranged at the bottom of the discharge port; and the rotor is in a transmission connection to the driving device, the rotor is arranged inside the drum and is arranged coaxially with the drum, and the cleaning chamber is connected to the feed port and the discharge port.

3. The bottle label removing and cleaning integrated system of claim 2, wherein the plurality of moving blades are detachably fixed on an outer sidewall of the rotor, and the plurality of fixed blades are detachably fixed on an inner wall of the drum.

4. The bottle label removing and cleaning integrated system of claim 3, wherein each of the plurality of moving blades comprises a mounting plate and a rubbing plate vertically fixed on the mounting plate.

5. The bottle label removing and cleaning integrated system of claim 4, wherein the mounting plate is detachably fixed on the outer sidewall of the rotor by a plurality of bolts, and a plane of the rubbing plate away from the mounting plate is in an inclined step-shape.

6. The bottle label removing and cleaning integrated system of claim 2, wherein the label removing and cleaning machine is provided with a plurality of water injection ports in communication with the cleaning chamber.

7. The bottle label removing and cleaning integrated system of claim 2, wherein the machine base comprises a left machine base and a right machine base that are fixed on a bottom base.

8. The bottle label removing and cleaning integrated system of claim 7, wherein the drum and the rotor are mounted between the left machine base and the right machine base.

9. The bottle label removing and cleaning integrated system of claim 7, wherein the driving device includes a motor and is detachably fixed on the bottom base on one side of the left machine base.

10. The bottle label removing and cleaning integrated system of claim 9, wherein the motor drives the rotor to rotate in the drum through a belt.

11. The bottle label removing and cleaning integrated system of claim 1, wherein the bouncing separation screen comprises an inclined frame, a screening mechanism, and a receiving tray, wherein the screening mechanism is mounted on an upper layer of the inclined frame to screen materials, and the receiving tray is mounted on a lower layer of the inclined frame to discharge labels, bottle caps, and impurities.

12. The bottle label removing and cleaning integrated system of claim 11, wherein the screening mechanism comprises a geared motor and a plurality of bouncing shafts, wherein the geared motor is mounted on one side of the inclined frame to drive the plurality of bouncing shafts to rotate on the inclined frame, and a plurality of bouncing screening sheets are evenly arranged on axial outer sides of the bouncing shafts.

13. The bottle label removing and cleaning integrated system of claim 12, wherein bouncing screening sheets of two adjacent bouncing shafts are arranged in a staggered manner, and a gap is provided between two adjacent bouncing screening sheets on a same bouncing shaft.

14. The bottle label removing and cleaning integrated system of claim 12, wherein the bouncing screening sheet is in a shape of a Reuleaux triangle.

15. The bottle label removing and cleaning integrated system of claim 12, wherein a cover plate detachably fixedly connected to the inclined frame is arranged above the plurality of bouncing screening sheets.

16. The bottle label removing and cleaning integrated system of claim 15, wherein each of the bouncing screening sheets is designed with an upper layer and a lower layer.

17. The bottle label removing and cleaning integrated system of claim 16, wherein the upper layer is formed by the combination of vibrating and bouncing rotors, and driven by a gear motor.

18. The bottle label removing and cleaning integrated system of claim 11, wherein the bottom of the inclined frame is provided with a main material discharge port and a residue discharge port, and the residue discharge port is in communication with the cleaning liquid separator.

19. The bottle label removing and cleaning integrated system of claim 1, wherein the plurality of fixed blades are detachably fixed on the marking discs by bolts, and the marking discs are detachably fixed on the drum by bolts.

* * * * *